United States Patent [19]
Dombrowski

[11] Patent Number: 5,898,238
[45] Date of Patent: Apr. 27, 1999

[54] WAKEUP GENERATOR FOR USE WITH A MULTI-POSITION RESISTOR LADDER SWITCH

[75] Inventor: John Hugh Dombrowski, Ypsilanti, Mich.

[73] Assignee: Ford Motor Company, Dearborn, Mich.

[21] Appl. No.: 09/005,673

[22] Filed: Jan. 12, 1998

[51] Int. Cl.⁶ ....................................................... G06F 1/32
[52] U.S. Cl. ................. 307/130; 364/273.1; 364/528.27; 364/948.8; 395/184.01; 395/750.06
[58] Field of Search .................... 307/112, 130, 307/116; 364/707, 273.1, 528.27, 948.8; 395/750.06, 750.01, 184.01

[56] References Cited

U.S. PATENT DOCUMENTS

| | | | |
|---|---|---|---|
| 4,965,550 | 10/1990 | Wroblewski | 395/184.01 |
| 5,073,943 | 12/1991 | Chapman | 381/86 |
| 5,203,000 | 4/1993 | Folkes et al. | 395/750.06 |
| 5,216,674 | 6/1993 | Peter et al. | 371/29.5 |
| 5,355,503 | 10/1994 | Soffel et al. | 364/707 |
| 5,483,517 | 1/1996 | Kurata et al. | 370/13 |
| 5,485,625 | 1/1996 | Gumkowski | 395/800 |
| 5,621,250 | 4/1997 | Kim | 307/10.1 |
| 5,633,537 | 5/1997 | Kurata et al. | 307/10.6 |
| 5,665,897 | 9/1997 | Lippmann et al. | 73/1.01 |

*Primary Examiner*—Albert W. Paladini
*Attorney, Agent, or Firm*—Roger L. May; Mark L. Mollon

[57] ABSTRACT

A wakeup generator for generating an interrupt pulse to a microcontroller (10) of an electronics module in response to a switch position change of a multi-position resistance ladder switch (14) to awaken the microcontroller (10) from a low power sleep mode. The wakeup generator uses a low current constant current source (18) and a detector (12). The low current constant current source (18) provides sense current for the switch (14) with a voltage developing across the switch varying according to the switch position selected with each switch position developing a different voltage. The detector detects a change in the voltage across the switch due to a switch position change and generates the interrupt pulse to the microcontroller.

4 Claims, 5 Drawing Sheets

WAKEUP GENERATOR FOR USE WITH A MULTI-POSITION RESISTOR LADDER SWITCH

FIELD OF THE INVENTION

The present invention relates generally to automotive electronic systems, and, more particularly, to low quiescent current circuitry for awakening automotive electronic systems from an inactive or sleep mode.

BACKGROUND OF THE INVENTION

Automotive electrical systems provide a number of operating, safety and convenience functions using various control modules. These systems and control modules ultimately derive their electrical power from the vehicle battery. When the engine is not operating, the battery supplies power without simultaneously recharging thereby draining the battery making it ineffective to start the vehicle engine when required to do so. Many electronic modules have an inactive or sleep mode that reduces power consumption.

Typically, an automotive electronics module uses an input circuit employing a pull-up resistor and a voltage reference to form a voltage divider with the resistor in a multi-resistor function switch to generate a voltage representing the selected switch position. The module microcontroller periodically checks the voltage level on this circuit to determine whether any action is required. Unfortunately, this periodic checking along with the bias current provided to the switch's resistors consumes power that will drain the battery if it operates when the engine is off. Also, the amount of power consumed depends on the resistance selected by the multi-function switch.

Another method compares the voltage applied by the multi-resistor function switch with a fixed voltage reference. This method provides a wakeup signal only when the switch is placed in a certain position. Accordingly, it will be appreciated that it would be highly desirable to have a circuit to wakeup the microcontroller when the function switch is moved from any position to any other position that uses very little power.

SUMMARY OF THE INVENTION

The present invention is directed to overcoming one or more of the problems set forth above. Briefly summarized, according to one aspect of the present invention, a wakeup generator for generating an interrupt pulse to a microcontroller of an electronics module in response to a switch position change of a multi-position resistance ladder switch with the interrupt pulse being suitable for waking the microcontroller from a low power sleep mode comprises a constant current source and a detector. The low current constant current source provides sense current for the switch with a voltage developing across the switch varying according to the switch position selected with each switch position developing a different voltage. The detector detects a change in the voltage across the switch due to a switch position change and generates the interrupt pulse.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
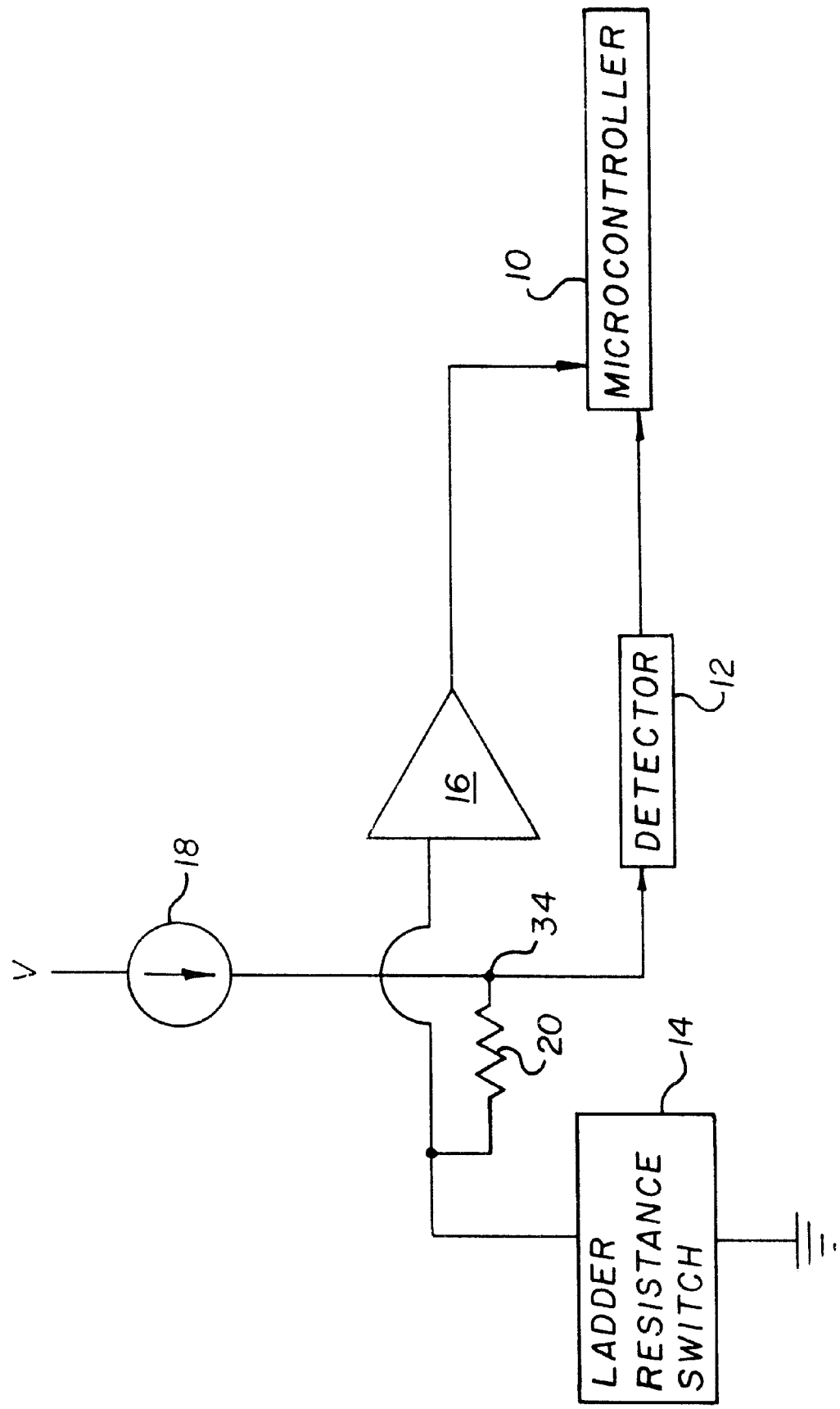
FIG. 1 is block diagram of a preferred embodiment of a wakeup generator for producing a wakeup pulse for a microcontroller of an automotive control module.

Referring to FIG. 1, a microcontroller 10 is awakened from its inactive or sleep mode when it receives a wakeup signal from detector 12. When awakened from its sleep mode by a wakeup pulse, microcontroller 10 processes the signal from multi-resistor position switch 14 that it receives via buffer 16. Constant current source 18 provides sense current for the multi-resistor position switch 14 via load resistor 20. The wakeup generator circuitry generates an interrupt pulse to the electronic module's microcontroller suitable for waking the microcontroller from a low power sleep mode. The interrupt pulse is generated whenever a significant deviation in the circuits analog input voltage is detected. The wakeup generator circuitry incorporates a low current constant current source to provide sense current for the multi-resistor position switch, and a circuit that detects a change in the voltage across the position switch due to a switch position change.

Figure 2:
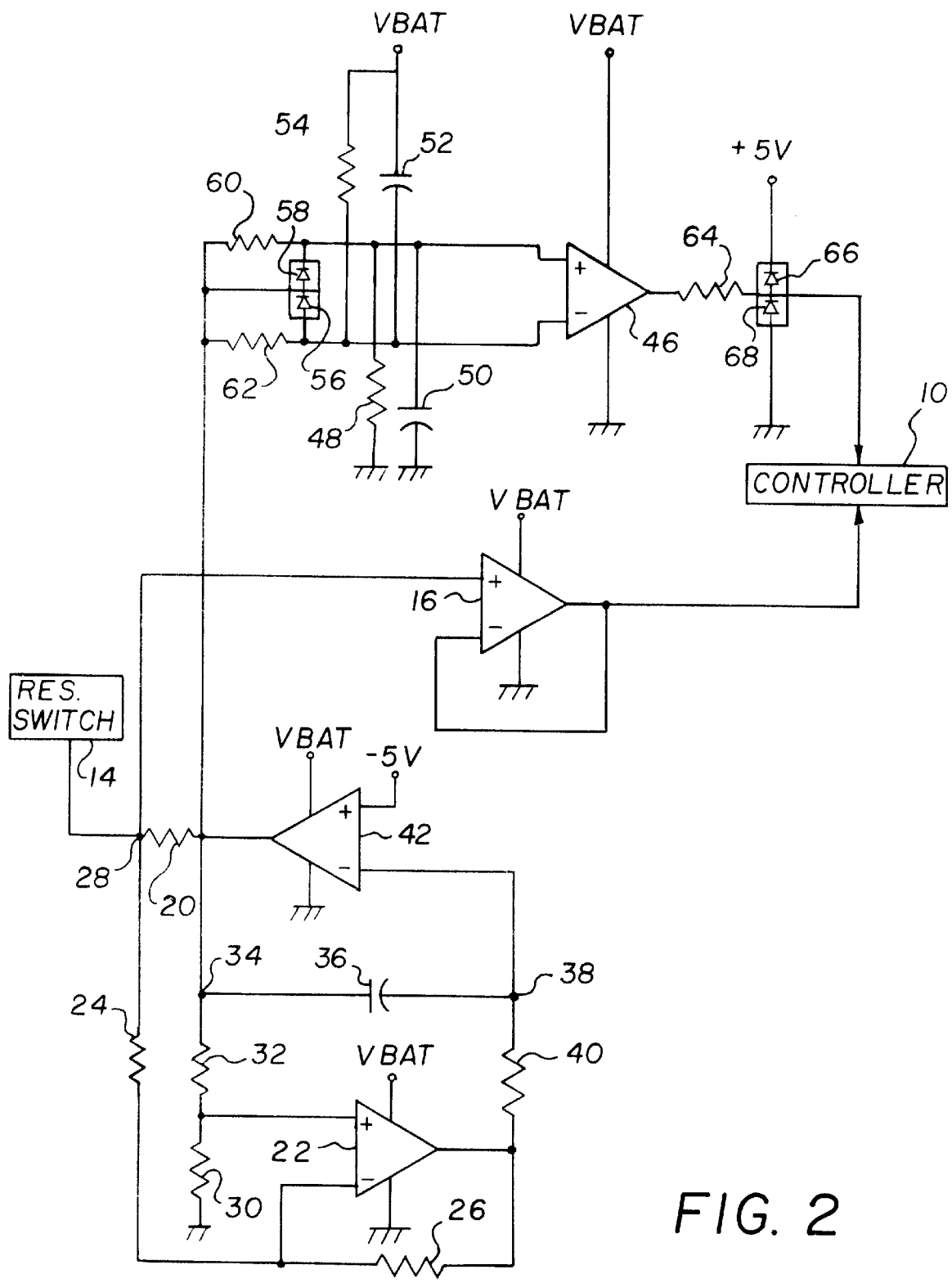
FIG. 2 is a schematic diagram of the wakeup generator of FIG. 1.

Referring to FIGS. 1 and 2, the inverting input of amplifier 22 is connected to resistor 24 and connected to feedback resistor 26 which is connected to the output of amplifier 22. Resistor 24 and switch 14 are connected at node 28. The noninverting input of amplifier 22 is connected to resistor 30 which has its other end grounded, and connected to resistor 32 which is connected at node 34 with fixed capacitor 36. Capacitor 36 has its other side connected at node 38 to resistor 40 which is connected to the output of amplifier 22. Inverting amplifier 42 has its inverting input connected to node 38 and its noninverting input connected to the negative reference voltage. The output of inverter 42 appears at node 36. Resistor 20 is connected between nodes 28 and 34.

The constant current source 18 preferably produces a 250µa current using amplifier 42 as a current driving source and amplifier 22 as a current to voltage feedback amplifier. The current that passes through resistor 20 is the same current that passes through the resistor position switch. The voltage drop across resistor 20 due to that current is amplified by amplifier 22 and it's associated components, namely resistors 24, 26, 30 and 32. The output of amplifier 22 is compared to a 5 volt reference voltage by amplifier 42. Amplifier 42 adjusts the current through resistor 20 so that the output of amplifier 22 matches the 5 volt reference voltage. Resistor 40 and capacitor 36 provide loop compensation to keep the constant current source stable when the resistance of the position switch abruptly changes.

Buffer 16 has its input connected to node 28 to receive the voltage signal from switch 14. Buffer 16 delivers a signal to the microcontroller representative of the switch position.

Detector 12 is connected to node 34 where the voltage changes when the position of switch 14 changes. Detector 12 includes comparitor 46 which has grounded capacitor 48 and grounded resistor 50 connected in parallel to its noninverting input, and has capacitor 52 and resistor 54 connected in parallel to its inverting input. Capacitor 52 and resistor 54 are also connected to the supply voltage. Series connected diodes 56, 58 are connected across the comparitor inputs and have their centerpoint connected to node 34. Resistor 60 is connected to the noninverting input of comparitor 46 and to node 34, and resistor 62 is connected to the inverting input of comparitor 46 and to node 34.

The output of comparitor 46 is connected to output resistor 64 which is connected to the centerpoint of series connected diodes 66, 68. Diode 66 has its anode connected to the positive reference voltage and its diode 68 has its cathode grounded.

Figure 3:
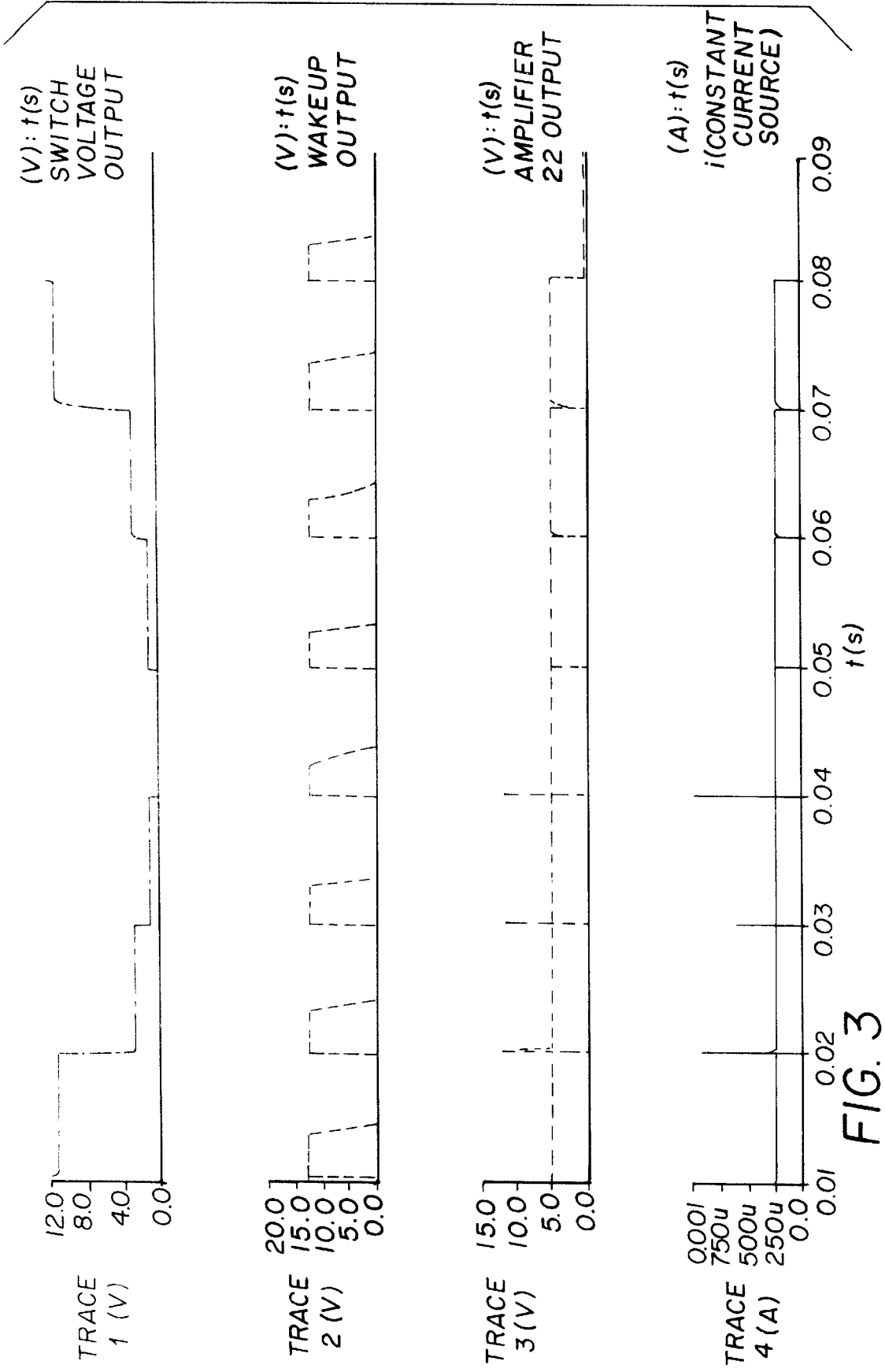
FIG. 3 is a graph illustrating the relationship between various inputs and outputs of components of the wakeup generator of FIG. 1.

Referring to FIG. 3, the sense current (Trace 4) through resistor 20 remains constant as the switch voltage output (Trace 1) varies as the switch position changes. The voltage output (Trace 3) of amplifier 22 remains fairly constant. On the other hand, the voltage output (Trace 2) of comparitor 46 is a pulse each time the switch position changes.

Figure 4:
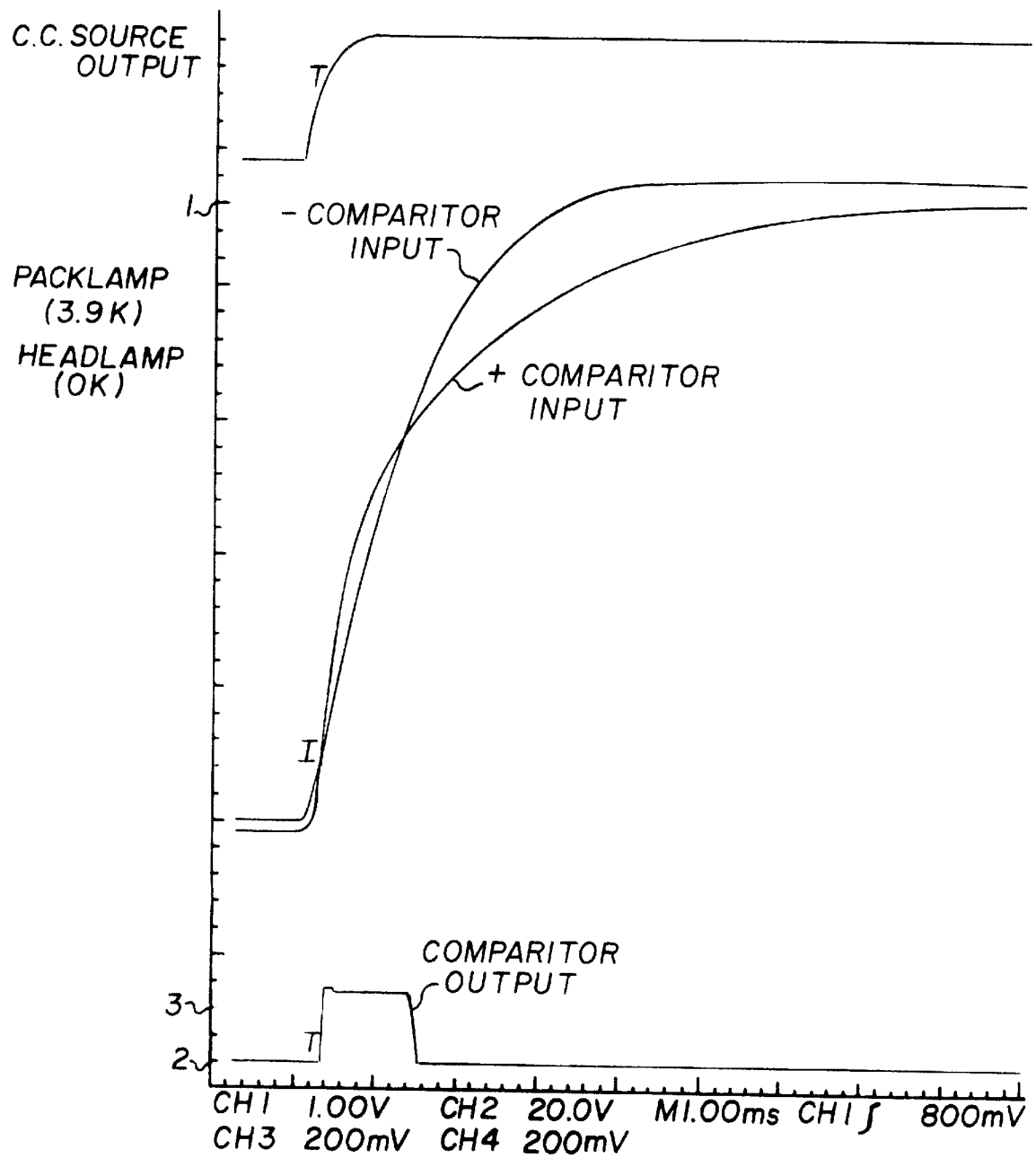
FIG. 4 is graph similar to FIG. 3 illustrating comparitor inputs and out put for a particular application.

FIG. 4 illustrates an application of the signal generator used with a lighting module where the switch is operated to turn on the parking lights. The resistance value in this instance is 3.9 kΩ. The constant current output ramps to its steady state level. The comparitor inputs go from an equal value producing a low level output to unequal producing a pulse that lasts until the inputs are again balanced, then falls back to its low level. When the switch resistance changes, the voltage at node 34 changes. A change greater than about 0.6 volts forward biases one of the directional diodes causing it to conduct to produce an output at comparitor 46. A positive change causes diode 58 to conduct charging capacitor 50 and causes the output of comparitor 46 to go high to the positive supply voltage. Diode 66 conducts when the comparitor output exceeds the positive reference voltage limiting the magnitude of the wakeup signal to the positive reference voltage. A negative change causes diode 56 to conduct charging capacitor 52 and causes the output of comparitor 46 to go high. Diodes 56, 58 thus direct the changing switch position voltage signal to operate comparitor 46 to produce the wakeup pulse.

Figure 5:
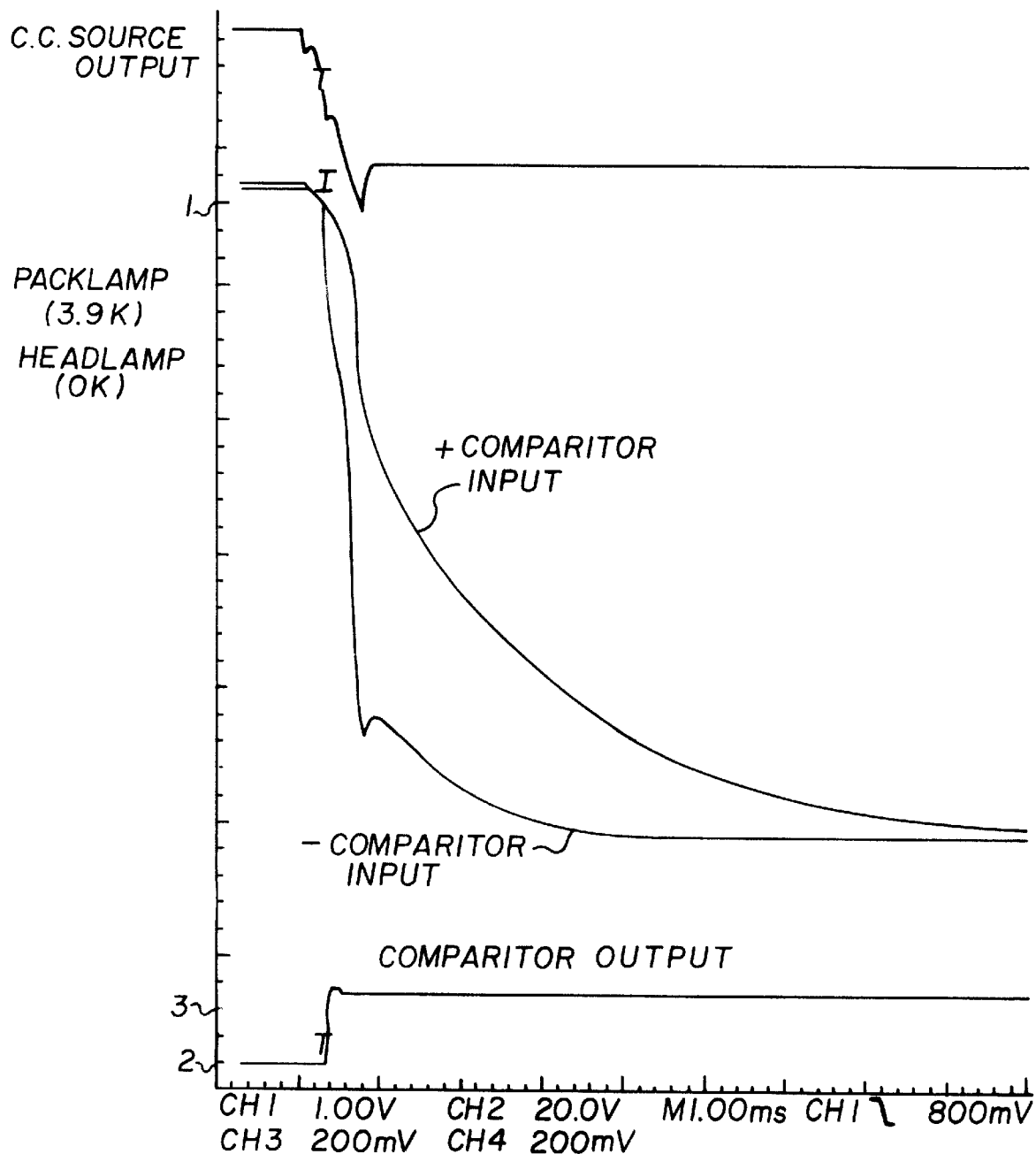
FIG. 5 is graph similar to FIG. 4 illustrating comparitor inputs and out put for another application.

FIG. 5 illustrates an application of the signal generator used with a lighting module where the switch is operated to turn on the headlights. The resistance value in this instance is nominally 0.0 kΩ. The constant current output ramps to its steady state level. The comparitor inputs go from an equal value producing a low level output to unequal producing a pulse that lasts until the inputs are again balanced, then falls back to its low level. When the switch resistance changes, the voltage at node 34 changes. A change greater than about 0.6 volts forward biases one of the directional diodes causing it to conduct to produce an output at comparitor 46. A positive change causes diode 58 to conduct and the output of comparitor 46 to go high to the positive supply voltage. Diode 66 conducts when the comparitor output exceeds the positive reference voltage limiting the wakeup signal to a brief pulse. A negative change causes diode 56 to conduct and the output of comparitor 46 to go high. Diodes 56, 58 thus direct the changing switch position voltage signal to operate comparitor 46 to produce the wakeup pulse.

It can now be appreciated that a wakeup signal generator has been described. The wakeup signal generator contains circuitry that is useful in detecting a change in position in a multi-resistor position switch by an electronic module which is in an inactive mode. The constant current source limits the amount of quiescent current consumed by the module to detect the position of the multi-position switch regardless of the resistance value selected by the switch. The power required to detect the position of the switch is reduced and remains constant no matter which position on the switch is selected. The circuitry allows the microcontroller to exit its lowest power operational mode upon any change in the switch position.

While the invention has been described with reference to the preferred embodiments, it will be understood by those skilled in the art that various changes may be made and equivalents may be substituted for elements of the preferred embodiment without departing from invention. For example, the circuits have been configured around LM2902N operational amplifiers but other components may be used. In addition, many modifications may be made to adapt a particular situation and material to a teaching of the invention without departing from the essential teachings of the present invention. It is accordingly intended that the claims shall cover all such modifications and applications as do not depart from the true spirit and scope of the invention.

What is claimed is:

1. A wakeup generator for generating an interrupt pulse to a microcontroller of an electronics module in response to a switch position change of a multi-position resistance ladder switch, the interrupt pulse being suitable for waking the microcontroller from a low power sleep mode, comprising:

a low current constant current source providing sense current for the switch with a voltage developing across said switch varying according to the switch position selected with each switch position developing a different voltage for input to the microcontroller for controlling a function associated with the switch position selected; and detector means for detecting a change in the voltage across the switch due to a switch position change and generating the interrupt pulse to awaken the microcontroller from the sleep mode.

2. A wakeup generator, as set forth in claim 1, wherein said constant current source has an output of about 250 microamperes.

3. A wakeup generator, as set forth in claim 1, wherein said detector means includes directional diodes for detecting a voltage change in either direction above a preselected threshold level.

4. A wakeup generator, as set forth in claim 1, including a buffer that receives the voltage developed across the switch and delivers a signal to the microcontroller representative of the switch position.

* * * * *